United States Patent [19]

Chuang

[11] 3,816,267
[45] June 11, 1974

[54] INHIBITION OF ACRYLATE POLYMERIZATION

[75] Inventor: Vincent T. Chuang, Marietta, Ohio

[73] Assignee: Union Carbide Corporation, New York, N.Y.

[22] Filed: Aug. 20, 1971

[21] Appl. No.: 173,653

[52] U.S. Cl. ............... 203/8, 203/62, 203/DIG. 21, 260/448.2, 260/486 R
[51] Int. Cl. .......................................... C07c 69/54
[58] Field of Search .... 203/8, 9, 6, 62, 65, DIG. 21; 260/486 R, 448.2

[56] References Cited
UNITED STATES PATENTS

| | | | |
|---|---|---|---|
| 2,171,795 | 9/1939 | Kautter | 203/8 |
| 2,399,340 | 4/1946 | Franz | 203/9 |
| 2,741,583 | 4/1956 | Vaughan | 203/8 |
| 2,882,207 | 4/1959 | Anspon | 203/8 |
| 3,239,433 | 3/1966 | Costolow | 203/8 |
| 3,666,794 | 5/1972 | Otsuki et al. | 260/486 R |
| 3,674,651 | 7/1972 | Otsuki et al. | 203/8 |

OTHER PUBLICATIONS

Offenlegungsschrift, 2,027,655, Jan. 7, 1971

*Primary Examiner*—Wilbur L. Bascomb, Jr.
*Attorney, Agent, or Firm*—George A. Skoler

[57] ABSTRACT

This invention is concerned with inhibiting acrylates or methacrylates against polymerization during their distillation by providing predetermined and controlled quantities of a mixture of a quinone and an enol derivative of a quinone in the acrylates or methacrylates while they are undergoing distillation.

5 Claims, No Drawings

INHIBITION OF ACRYLATE POLYMERIZATION

This invention relates to separation of acrylates and methacrylates from crude mixtures containing such acrylates and methacrylates by the process of distillation without adverse polymerization of such acrylates or methacrylates during distillation. More particularly, this invention relates to the stabilization against polymerization of vaporous acrylates or methacrylates during distillation of the same from a crude mixture.

Acrylates and methacrylates, that is, esters of acrylic and methacrylic acid, are readily susceptible to polymerization. Heat alone is sufficient to cause their polymerization to relatively high molecular weight polymers. Therefore, whenever one wishes to work with a methacrylate or acrylate while in the vapor state, great care must be given to avoid such polymerization. The art has prescribed a number of chemicals which serve to inhibit such polymerization. The most popular inhibitors of the polymerization of the acrylates and methacrylates have been hydroquinone and methoxy ether of hydroquinone with or without the addition of air.

Generally speaking, the polymerization inhibitor of choice is a compound which, in the vapor state with the methacrylates and acrylates, is present in sufficient quantity to prevent polymerization of the esters as they are passing up through the distillation column and out of it to where it is collected free of the crude products in which it was originally contained. It is not necessary that the stabilizer of choice have the exact same boiling point or the same vapor pressure characteristics as the acrylates or methacrylates. What is important is that a sufficient amount of it will be carried with the esters during the distillation so as to prevent polymerization, be carried through the column with the esters and be collected with the esters when they are cooled from the vapor state.

Generally, the methacrylates and acrylates are separated from a crude which comprises the by-products of the reaction which forms the esters, catalysts (if employed in the manufacture of the esters) and any other residual products that can result from such processing. Also present in the crude is a material which serves to inhibit polymerization of any of the by-products or residual products present therein during the heating of the crude in order to cause the vaporization of the acrylates or methacrylates. Such inhibitors are relatively non-volatile materials under the conditions of distillation and hence are not carried off with the acrylate or methacrylate esters through the distillation column and thereby function to inhibit polymerization of any of the materials present in the crude during heating thereof to achieve distillation. Illustrative of such materials are N,N'-diphenyl-p-phenylene diamine and phenothiazine.

Heretofore, the best stabilizers for preventing polymerization during the volatilization, vaporization and isolation of acrylates and methacrylates have been inadequate because small fluctuations in the operation of the distillation column or small changes in the composition or the pH of the crude adversely affect the ability of the polymerization inhibitor to restrain polymerization during distillation. This problem is not to be confused with the stabilization of the residue left behind during the distillation of the acrylate and methacrylate ester since its polymerization is generally adequately controlled by the inhibitors which are employed for that purpose.

There is described herein a combination of chemicals, more properly stated as a combination of functionalities, which when provided with the acrylate or methacrylate ester vapors in a distillation column most effectively prevent the polymerization of these esters even with the most significant variations which could occur either in the nature of the crude or in the operation of the column. The inhibitors of this invention are a quinone and an enol derivative of a quinone which are provided with the methacrylate or acrylate ester vapors as they are evolved or vaporized from the crude within the column. The combination of the quinone and the enol derivative of a quinone provides results which each alone cannot provide. That is to say, the combination of a quinone and an enol derivative of a quinone provides better polymerization inhibition than would be achievable from a quinone alone or an enol derivative of a quinone alone. This synergistic effect allows for significant diverse variations in the nature of the crude being distilled and/or the operation of the distillation column, based on reasonable practices as occurs in the normal manufacture of such crudes and the normal and usual operation of such distillation columns.

The quinones constitute any cycloaliphatic compound which contains therein a carbonyl group wherein the carbon thereof is wholly carbon bonded in forming part of the cycloaliphatic ring. The enol derivative of a quinone is the same structure except that the carbonyl group is in the form of

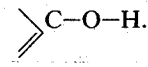

The quinone and enol derivative of a quinone can be present in the same molecule, that is, the stabilizer can be a single molecule which contains therein both the quinone structure and the enol derivative of a quinone structure therein. The simplest characterization would be naphthazarin. In the preferred practice of this invention, the quinone and the enol derivative of a quinone are present as parts of separate molecules and therefore, two distinct chemical compounds are employed in order to affect the stabilization against polymerization as described herein. A particularly preferred combination of such compounds is hydroquinone and benzoquinone. Hydroquinone is the enol derivative of benzoquinone.

Illustrative of the quinones and the enol derivatives of the quinones which can be employed in the practice of this invention include, for example, hydroquinone, benzoquinone, quinizarin, naphthazarin, naphthoquinone, naphthahydroquinone, bis(4,4-dimethylcyclohex-2,6-dione)methane, anthraquinone, phenanthraquinone, 2,5-di-tertiary-butylhydroquinone, 2,5-diphenyl-p-benzoquinone, methoxyhydroquinone, methyl-hydroquinone, phenyl-p-benzoquinone, the various enol derivatives not specifically mentioned of the various quinones defined above, and the like.

The employment of pre-select quantities of a quinone and the enol derivative in the acrylate or methacrylate is not equivalent to the addition of oxygen to hydroquinone or methoxyhydroquinone inhibited acrylate or methacrylate. It has been offered by some experts that oxidation of hydroquinone results in producing some benzoquinone, and some experts have regarded benzoquinone as the polymerization inhibiting species. Some experts have argued that oxygen per se acts to inhibit polymerization and it alone functions as the inhibitor. The addition of oxygen to hydroquinone stabilized acrylate or methacrylate provides uncertain inhibition, that is, erratic results. Regardless of the theories accepted, in the continuous operation of the distillation of hydroquinone stabilized acrylates and methacrylates, oxygen addition does not preclude gel formation through polymerization, yet the addition of preselected amounts of hydroquinone and benzoquinone will inhibit such polymerization under the same conditions.

The amount of the quinone and the enol derivative of a quinone which is provided to the vapors of the acrylate or methacrylate esters during distillation is dependent upon a number of factors. For example, one can employ an amount of these stabilizers, on a mole or weight basis, equal to the esters being distilled. However, this would be wholly impractical from a commercial standpoint though the safest type of inhibition from polymerization under any distillation condition would be achievable. The amount that one employs of these stabilizers in practicing the invention is generally dependent upon the type of distillation taking place, the longevity or continuity of the distillation operation, the pressure under which distillation is being effected, the temperature of the distillation column, the length of the distillation column, the concentration of the acrylates or methacrylates in the crude being distilled versus the size of the column, the residence time of the acrylate or methacrylate esters in the column, and the like. Whenever there is prolonged distillation of such esters or there is prolonged residence time of the esters in the column or the temperature in the column is substantially higher than the boiling point of the particular esters undergoing distillation, it is desirable that the amount of the stabilizer combination in the acrylate or methacrylate esters within the column constitute at least 50 parts per million, based on the weight of the esters undergoing distillation within the column. Preferably, under such conditions, there is at least 100 parts per million of each of such stabilizer in the column. By this, it is meant that the weight of the stabilizer, whether a mixture of quinone or enol derivatives of a quinone, or a single molecule which contains both functionality, such should constitute with respect to each such type of functionality at least about 50 parts per million. That means that a single molecule containing both functionality would be provided in amounts of at least about 100 parts per million. However, if the temperature within the column is low, and one employs reduced pressure, and the distillation is not prolonged, significantly lower amounts of these stabilizers can be present in the column, such as, as little as 10 parts per million, same basis. The ratio of the quinone to the enol derivative of the quinone in the stabilizing mixture is such that for each mole of the quinone moiety there is from about 0.2 to about 2 moles of the enol moiety. Of course, larger and smaller amounts of the enol derivative may be employed if the amount of the quinone is relatively large and the conditions under which distillation are being effected is such as to allow such deviation.

This invention is applicable to the inhibition of polymerization of essentially any of the acrylate or methacrylate esters since the polymerization of any of the acrylates or methacrylates is not dependent upon the nature of the ester group of the acrylate or methacrylate except in those rare cases where the ester groups act to produce free radicals which reduce the temperature at which polymerization is initiated, and in such cases, this invention is still applicable. This invention involves the polymerization inhibition of essentially all of the known acrylates or methacrylates which have a boiling point, determined at normal atmospheric pressure, of not more than about 350°C. Thus, excluded are polymers of exceptionally high molecular weight which possess either pendant acrylate moieties or chain-terminating acrylate moieties, and exceptionally high boiling points, which because of their boiling points would not be distilled but, rather, would be purified by either crystallization or solvent extraction. This invention ralates to the polymerization inhibition of acrylate or methacrylate esters which are normally purified by distillation procedures as distinguished from purification by crystallization, solvent extraction, and the like. Illustrative of such acrylate and methacrylate esters are, for example, methyl acrylate, methyl methacrylate, ethyl acrylate, ethyl methacrylate, n-butyl acrylate, n-butylmethacrylate, isobutyl methacrylate, isobutyl acrylate, n-propyl acrylate, n-propyl methacrylate, 2-ethylhexyl acrylate, 2-ethylhexyl methacrylate, n-octyl acrylate, n-octyl methacrylate, octadecyl acrylate, octadecyl methacrylate, phenyl acrylate, phenyl methacrylate, 2-anthracyl acrylate, 2-anthracyl methacrylate, 2-naphthyl methacrylate, 2-naphthyl acrylate, 4,4'-bis(methacryloxy)diphenyl methane, 4,4'-bis(acryloxy)diphenyl propane-2, 1,4-bis(methacryloxy)cyclohexane, cyclohexyl acrylate, cyclopentyl acrylate, cyclooctyl methacrylate, 1,2-bis(acryloxy)ethane, the dimethacrylic acid ester of diethylene glycol, 2-hydroxyethyl acrylate, 2-amino-ethyl acrylate, 2-aminoethyl methacrylate, 5-methoxy-beta-ethoxy ethyl acrylate, allyl acrylate, allyl methacrylate, glycidyloxy acrylate, glycidyloxy methacrylate, gamma-methacryloxypropyl(trimethoxy)silane, gamma-methacryloxyisobutyl (trimethoxy)silane, gamma-methacryloxy-propyl (triethoxy)silane, gamma-methacryloxypropyl[tris(beta-methoxy ethoxy)] silane, and the like.

Of the various acrylate and methacrylate esters known, the methacrylate and acrylate esters which have a hydrolyzable silicon group bonded to the ester moiety, such as a trimethoxysilyl moiety, represent the most difficult to stabilize from distillation when distilled from a crude mixture containing them. The basis for this is the belief that during distillation, heat causes a certain number of the hydrolyzable groups, such as, for example, methoxy groups, to be cleaved from the silicon atom and act as a free radical which induces polymerization at a lower temperature than would be normally expected for such an acrylate or methacrylate molecule. Hence, a severe test for inhibiting the polymerization of acrylate and methacrylate esters would be the stabilization of such methacrylato or acrylato silane esters as depicted above. There is shown hereafter, in the examples that the stabilization system of this invention provides for most desirable polymerization inhibition of such difficult to stabilize acrylate and methacrylate esters.

The stabilizer composition as aforedefined can be provided in the crude prior to distillation thereof, or can be injected into the distillation column, approximately above the liquid phase within the column, so as to provide with the vapors as they migrate up through the column the desired quantities of the quinone and enol derivatives of quinone, as aforedefined, for inhibiting polymerization. The result of adding these stabilizers to the methacrylate or acrylate esters prior to or during distillation is that the finally collected and distilled acrylate and methacrylate esters will contain an amount which approximates that amount of the stabilizers which had been added prior to or during distillation.

The following is presented for the purpose of demonstrating the practice of this invention and should not be considered for the purpose of limiting the scope of this invention.

The following apparatus and procedure were employed in the examples below to ascertain the thermostability of the polymerization inhibitors there employed.

Apparatus:

A 4 oz. wide-mouth bottle provided with a thermocouple connected to a temperature recorder, a Teflon (trade mark) coated magnetic stirrer, and glass tubing connected to a nitrogen source and immersed in the liquid sample provided in the bottle for slow bubbling of nitrogen.

Procedure:

A 100 grams sample to be tested is charged to the 4 oz. bottle and the thermocouple and glass tubing are held in place by means of a rubber stopper with three holes. The bottle is partially (about half way) immersed in an oil bath maintained at a constant temperature of 160°C. such that the temperature of the bulk sample is 10°C. lower than that of the oil bath as long as the sample remains fluid with stirring. When the sample gels, however, the magnet stops rotating and, therefore, the temperature rise (to approach that of the oil bath) of the localized sample becomes imminent and is readily detectable by the recorder. The gel time is defined as the time required to reach the state of gel detectable as a temperature rise at the test temperature.

EXAMPLE 1

To 110 gms. of gamma-methacryloxypropyltrimethoxysilane containing 200 ppm (parts per million) of hydroquinone was added 0.0275 gm. of p-benzoquinone (250 ppm). The sample, when tested as described above, showed a gel time of 16 hours under nitrogen atmosphere. When the same amount of hydroquinone (0.0275 gm.) was added to another sample of the same methacrylate containing 200 ppm of hydroquinone and free p-benzoquinone, the gel time under nitrogen was 4½ hours.

EXAMPLE 2

To 105 gms. of freshly distilled gammamethacryloxypropyltrimethoxysilane was added 10.3 mgs. (100 ppm) of p-benzoquinone. The sample exhibited a gel time of 2 hours while the sample from the same batch of the silane but containing 100 ppm of hydroquinone instead gave a gel time of 7 hours under the same test conditions (both under nitrogen atmosphere).

EXAMPLE 3

Using the same batch of freshly distilled gamma-methacryloxypropyltrimethoxysilane as was employed in Example 2 but containing 50 ppm each of hydroquinone and p-benzoquinone (by adding 5.4 mgs. and 5.5 mgs. respectively to 105 gms. of the sample), the test under nitrogen showed the gel time to be 17 hours.

Repeating the above procedure, partial oxidation of hydroquinone in situ by air bubbling into a gamma-methacryloxypropyltrimethoxysilane sample was found to be difficult to control in terms of polymerization inhibition. Scattered results were obtained varying from a gel time of 8 hours to 2 hours when air bubbling was used in the test, presumably, depending on the degree of oxidation of hydroquinone. A theoretical total conversion of hydroquinone to benzoquinone could make the system less effective. Controlled oxidation of hydroquinone in situ has never achieved as good a stability as when both hydroquinone and benzoquinone were added into the system. Illustrative of an extreme case where the stability under air bubbling is inferior to that under nitrogen, gammamethacryloxypyropyltrimethoxysilane containing 700 ppm of hydroquinone showed a gel time of 5½ hours under nitrogen while air bubbling into the sample gave a gel time of 2¼ hours.

EXAMPLE 4

In the production-scale distillation of crude gamma-methacryloxypropyltrimethoxysilane where only hydroquinone (4,000 ppm) or p-methoxyphenol (4,000 ppm) was added as a stabilizer, column internals became completely fouled with polymer after operating for three days. By contrast, where both hydroquinone and p-benzoquinone were present (400 ppm each), the distillation proceeded without polymerization occurring in the column after continuous operation for three weeks.

What is claimed is:

1. The process of distilling acrylates or methacrylates having a boiling point determined at normal atmospheric pressure of not more than about 350°C. from a crude mixture containing same which comprises providing in said distilled acrylate or methacrylate vapors a pre-selected amount of a combination of a quinone and an enol form of a quinone sufficient to prevent polymerization of said acrylate or methacrylate during said distillation.

2. The process of claim 1 wherein the distilled acrylate or methacrylate is recovered and contains such predetermined amount of said combination.

3. The process of claim 1 wherein said combination is hydroquinone and benzoquinone.

4. The process of claim 1 wherein the distilled product is gamma-methacryloxypropyltrimethoxy-silane.

5. The process of claim 4 wherein said combination is hydroquinone and benzoquinone.

* * * * *